United States Patent
Yu et al.

(10) Patent No.: US 10,616,342 B2
(45) Date of Patent: Apr. 7, 2020

(54) SEMANTICS-BASED ARCHITECTURAL MODEL OF THE INTERNET OF THINGS

(71) Applicant: SHENYANG INSTITUTE OF AUTOMATION OF THE CHINESE ACADEMY OF SCIENCES, Liaoning (CN)

(72) Inventors: Haibin Yu, Liaoning (CN); Zhao Shi, Liaoning (CN); Peng Zeng, Liaoning (CN); Yang Liu, Liaoning (CN); Xing Tong, Liaoning (CN)

(73) Assignee: SHENYANG INSTITUTE OF AUTOMATION, CHINESE ACADEMY OF SCIENCES, Shenyang, Liaoning (CN)

( * ) Notice: Subject to any disclaimer, the term of this patent is extended or adjusted under 35 U.S.C. 154(b) by 654 days.

(21) Appl. No.: 14/778,354

(22) PCT Filed: Dec. 19, 2013

(86) PCT No.: PCT/CN2013/089934
§ 371 (c)(1),
(2) Date: Sep. 18, 2015

(87) PCT Pub. No.: WO2015/085620
PCT Pub. Date: Jun. 18, 2015

(65) Prior Publication Data
US 2016/0072892 A1     Mar. 10, 2016

(30) Foreign Application Priority Data
Dec. 10, 2013 (CN) .......................... 2013 1 0672335

(51) Int. Cl.
*H04L 29/08*     (2006.01)
*H04W 4/70*     (2018.01)

(52) U.S. Cl.
CPC ............ *H04L 67/12* (2013.01); *H04L 69/321* (2013.01); *H04L 69/327* (2013.01); *H04W 4/70* (2018.02)

(58) Field of Classification Search
CPC ..... H04L 67/12; H04L 69/321; H04L 69/327; H04W 4/005
See application file for complete search history.

(56) References Cited

U.S. PATENT DOCUMENTS

2014/0173076 A1* 6/2014 Ravindran .......... H04L 41/5058
                                                                    709/223
2014/0330929 A1* 11/2014 Dong .................. A61B 5/0022
                                                                    709/217
(Continued)

FOREIGN PATENT DOCUMENTS

| CN | 101587486 A | 11/2009 |
| CN | 102724711 A | 10/2012 |
| CN | 102880617 A | 1/2013 |

*Primary Examiner* — Philip J Chea
*Assistant Examiner* — Robert B McAdams
(74) *Attorney, Agent, or Firm* — Smith, Gambrell & Russell LLP

(57) ABSTRACT

The present invention relates to the field of architecture of Internet of Things, specifically to a semantics-based architectural model of Internet of Things. The present invention puts forward the architecture of the Internet of Things based on the study of semantic Web, sensor network, sensor Web, wherein the architecture is divided into 7 layers: physical layer, perception layer, gateway layer, data layer, semantic layer, service layer and application layer. By means of semantic processing of sensor data and building of sensor ontology, the architecture is capable of realizing automatic discovery of heterogeneous resources, enhancing the expression ability of data, achieving effective sharing, reuse, integration, and access to data, improving interoperability of resources and accomplishing intellectualized service.

15 Claims, 2 Drawing Sheets

(56) References Cited

U.S. PATENT DOCUMENTS

| | | | | |
|---|---|---|---|---|
| 2015/0006696 A1* | 1/2015 | Hershberg | ............. | H04L 67/12 709/223 |
| 2015/0012551 A1* | 1/2015 | Dong | ................... | H04W 4/70 707/755 |
| 2015/0163121 A1* | 6/2015 | Mahaffey | ........... | G06F 11/0766 707/687 |
| 2015/0195365 A1* | 7/2015 | Choi | ...................... | H04L 67/16 715/739 |
| 2015/0199610 A1* | 7/2015 | Hershberg | ............ | G06N 5/047 706/12 |
| 2015/0279366 A1* | 10/2015 | Krestnikov | ............ | G10L 15/26 704/235 |
| 2016/0006815 A1* | 1/2016 | Dong | ....................... | G06F 9/46 709/204 |
| 2016/0048573 A1* | 2/2016 | Muttik | ............. | G06F 17/30598 707/737 |

\* cited by examiner

SEMANTICS-BASED ARCHITECTURAL MODEL OF THE INTERNET OF THINGS

TECHNICAL FIELD

The present invention relates to the field of the architecture of the Internet of Things, specifically to a semantics-based architectural model of the Internet of Things.

DESCRIPTION OF RELATED ART

The Internet of Things (IoT) is a giant network formed by interconnection with the Internet that collects various information of objects or processes required for real-time monitoring, connection, and interaction via various information sensing devices. It is used to realize connectivity between people and people, people and objects, all objects and the network so as to facilitate identification, management, and control. At present, the architecture of the Internet of Things mainly has three layers: the sensor layer, network layer, and application layer. The design of the architecture is specific to particular fields, while the sensing devices, data processing, and communication protocols in diverse fields are heterogeneous, which leads to difficulty in interconnecting networks of different fields, realizing effective allocation and share of resources, and finding sensor information among the large amounts of data in networks for users. In 2005, OGC put forward a new-type Sensor Web Enablement (SWE) standard, but this architecture is designed based on XML mode. The data lacking in semantic properties cannot be understood by computers and sensors, therefore the interoperability between sensors is poor and the realization of ubiquitous intellectualized service is impossible. Furthermore, the sensor ontology in the prior art is deficient in semantic properties, for instance, when marking the data "30" obtained from a temperature sensor by means of the concept of "temperature" in the sensor ontology, the number "30" indicates temperature, but information about relevant time, spaces, associated persons, corresponding associated persons, and collection method is not shown; besides, the lack of semantic relationship between devices also leads to the incapability of determining correlation between devices and realizing cooperation between devices.

BRIEF SUMMARY OF THE INVENTION

To solve the problem of data deficient in semantic properties and devices deficient in semantic relationships in the architecture in the prior art, the present invention aims at providing a semantics-based architectural model of the Internet of Things so as to realize effective sharing, reuse, integration, and access to data, improving the interoperability of resources and achieving intellectualized service.

To realize the objectives above, the present invention employs the following technical solution:

a semantics-based architectural model of the Internet of Things, comprising: a system operator, an application layer, a service layer and a gateway layer, and further comprising a semantic layer, a data layer, a perception layer, and a physical layer;

the physical layer, including the entity to be perceived, is the object providing perception and operation for services and applications;

the perception layer, including the perception devices, is used to monitor the physical layer, collect data sent from the physical layer, and perform preliminary data processing;

the gateway layer is used to gather the data sent from the perception layer and send it to the data layer;

the data layer is a database consisting of sensor data, sensor information, real-object information, and other related information and used to store data information;

the semantic layer is used to build data models described by resources and establish classification and relationships between individuals by means of the construction of an ontology base; realize effective sharing, reuse, integration, and access to data by means of the semantic properties given to data;

generate new knowledge and relationships dynamically by means of knowledge inference;

the service layer is used to retrieve specific data in the database by means of the data model built in the semantic layer according to the specific application in the application layer, and generate services upon processing and upload to the application layer;

the application layer is used to receive the services uploaded by the service layer and realize the human-machine interaction of upper-layer applications.

The perception devices include a temperature sensor, a humidity sensor, an illumination sensor, and an electricity sensor.

The semantic properties include time, spaces, subjects, capability, collection object, collection mode, associated persons, and collection significance.

The classification of individuals includes the type to which various entities in the physical layer belong, the type to which various perceptrons in the perception layer belong, and the type to which various gateways in the gateway layer belong.

The relationships between individuals include the relationships between various entities, the relationships between various perceptrons, and the multi-layer relationships between the entities in the physical layer, the perception layer, and the gateway layer.

The system operator includes a system administrator, a device provider, an application developer, and a common user;

the system administrator maintains the normal operation of the whole system, and gives purview to other system operators to provide and use data, develop and use applications;

the device provider provides perception devices to obtain entity data and gives purview to the application developer to use data;

the application developer uses data for application development and gives purview to the common user to use applications;

the common user uses the applications provided by the application developer.

The present invention has the following advantages:

1. Capable of realizing automatic discovery of heterogeneous resources;
2. Capable of enhancing expression ability of data, realizing effective sharing, reuse, integration, and access to data;
3. Capable of improving interoperability of resources and realizing intellectualized service.

DETAILED DESCRIPTION OF THE INVENTION

The present invention is further detailed in combination with the drawings below.

Figure 1:
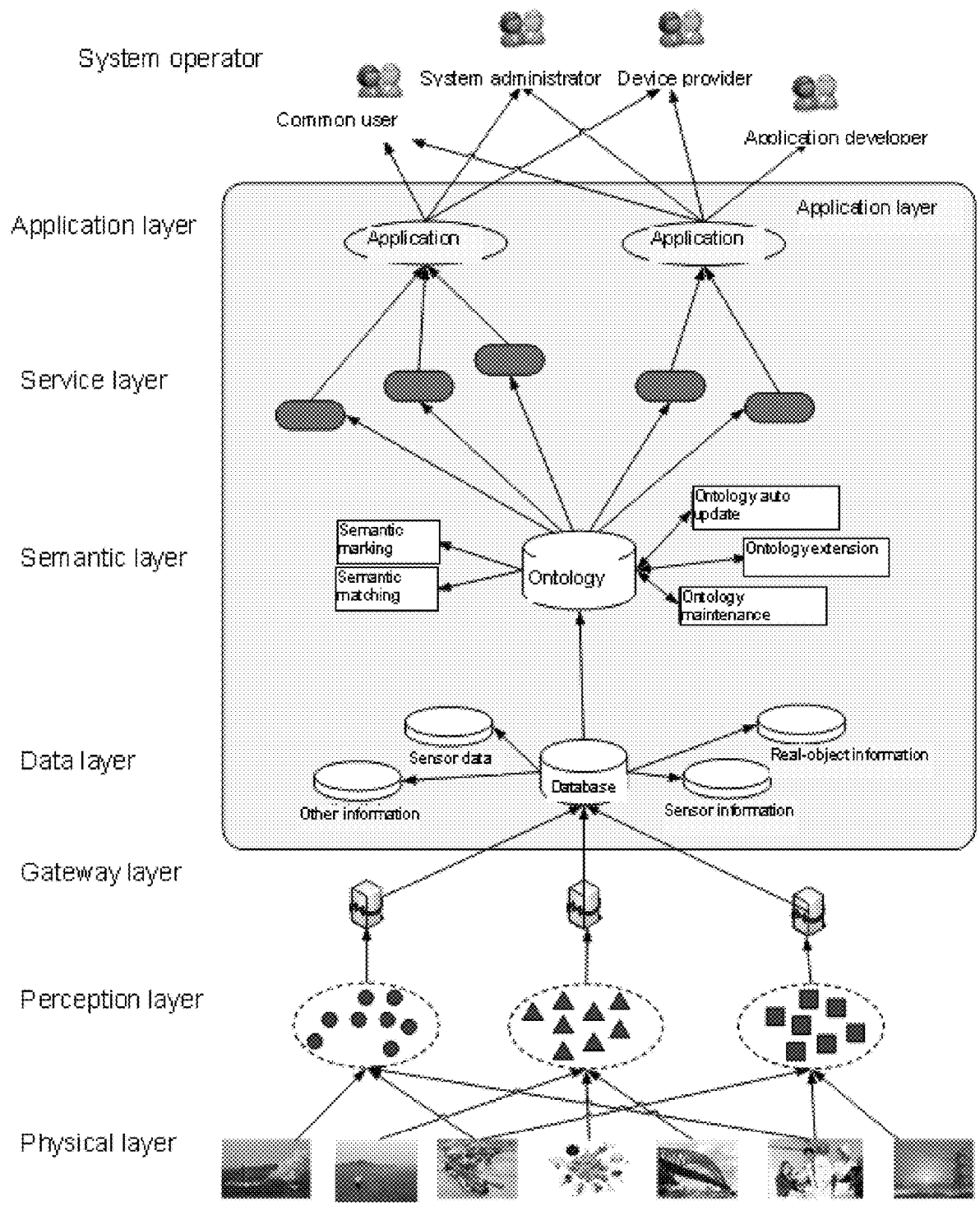
FIG. 1 is the view of the architecture of the present invention.

As shown in FIG. 1, by means of semantic processing of data, the present invention will enhance the expression ability of data, realize effective sharing, reuse, integration and access to data, improve the interoperability of resources, and realize intellectualized service. The architectural layers are specifically as follows:

The physical layer: this layer, including all entities to be perceived, is the provider of data sources and used to provide perception and operation objects to services and applications;

The perception layer, this layer, including the devices perceiving entities, is the acquirer of data sources and used to monitor the perception entities, collect data of entities, and perform preliminary data processing. The devices in this layer mainly include a temperature sensor, a humidity sensor, an illumination sensor, and an electricity sensor. Wherein, the temperature sensor is used to perceive the ambient temperature and interoperate with temperature regulation appliances such as an air conditioner; the humidity sensor is used to perceive ambient humidity and interoperate with the ventilation equipment; the illumination sensor is used to perceive the ambient illumination intensity and interoperate with the lighting equipment; the electricity sensor is used to perceive the energy consumption conditions of power use equipment, and realize more intellectualized service in combination with specific environment and persons.

The gateway layer: this layer, including some gateway devices, is used to gather the data collected by perception devices.

The data layer: this layer is used to realize the management of sensor data, storage and processing of sensor data collected. In the architecture according to the present invention, the physical layer, the perception layer and the gateway layer are designed separately in order to achieve better management of the metadata of entities, sensors, and gateways. Wherein, the database mainly contains the data collected by sensors, metadata of entities, sensors and gateways, information about system roles, and information about services and applications.

The semantic layer: this layer is used to build data models described by resources and establish classifications and relationships between individuals by means of the construction of an ontology base; realize effective sharing, reuse, integration, and access to data by means of the semantic properties given to data; generate new knowledge and relationships dynamically by means of knowledge inference. Wherein, the data model described by resources is a binary relation in the form of "resource-property-property value"; the semantic properties include information such as time, spaces, subject, capability, collection object, collection mode, associated persons, and collection significance; inference is to deduce new assertions based on existing assertions and ensure the completeness of the ontology base and convenient access and inquiry, and favorable decision-making support can be provided by means of effective inference.

In the semantic properties, the time property indicates the time for data collection; the space property indicates the location for data collection (or the location where the data reflected entity lies); the subject property indicates the significance that data represent; the capability property indicates parameters such as the scope, accuracy, error, or stability of data; the property of collection objects indicates the entity object of data collection; the collection mode property indicates the mode in which the entities obtain data (for instance: plug-in type or non-plug-in type); the property of associated persons indicates the persons related to the entity objects for collection; the property of collection significance indicates the function of data collection. For example, to monitor Room 308 for fire early-warning, the temperature monitored at 10:00 am is 25.0 degrees, then the time property of the data "25.0 degrees" is "10:00 am", the space property is "Room 308" (or other location mentioned), the subject property is "temperature", the capability property is "error±0.2" (or "accuracy 0.1"), the property of collection object is "Room 308", the collection mode is "non-plug-in type", the property of associated person is ever/one in Room 308, and the property of collection significance is "early-warning".

The service layer: this layer realizes functions such as intellectual collection of sensors, intellectual cooperation and configuration, automatic warning, intellectual discovery of resources, and multi-field data integration.

The application layer: this layer realizes interaction between users and sensor systems and other upper-layer applications by means of the development of sensor application tools and third-party plug-in units.

Furthermore, the architecture of the present invention includes the following types of operator roles: system administrator, device provider, application developer and common user. The system administrator maintains the normal operation of the whole system, and manages the data, devices, entities and persons; the device provider as the entity data provider uploads the data collected to the system platform, and manages the devices owned and related application development persons; the application developer develops related functions and services by means of lower-layer data; the common user uses these functions and services.

Figure 2:
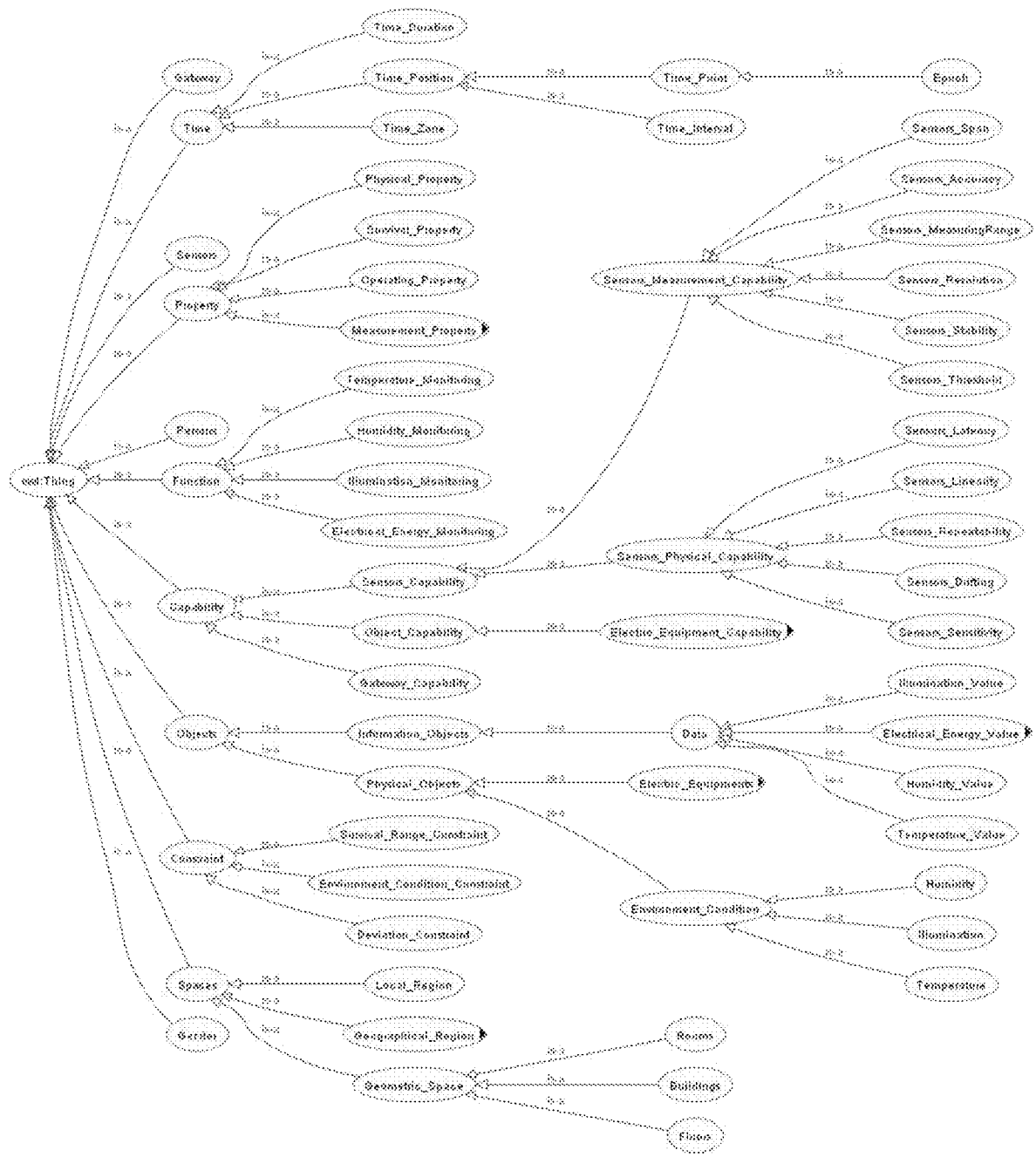
FIG. 2 is the structural view of the class relations of the ontology base according to the present invention.

FIG. 2 is the structural view of the class relations of ontology. The setting of classes includes an entity class and property class.

The entity class represents physical entity objects, including objects, sensors, gateways and persons; the monitoring entity object further classifies the monitored entities, including data entity objects and physical entity objects.

The property class represents property information, including property, capability, spaces, function, constraints, and time. The property denotes the property information of the entity object and some property information of the data, including property information of persons, some physical property information of physical entities, sensors and gateways, and property information of data collection mode and significance; the capability denotes the capability property information of data, including accuracy, measuring range, delay and error, etc.; the spaces denote the spacial property information of data, further divided into geographical location information, local position information and geometrical space information; the function denotes subject property information of data, further divided into temperature monitoring, illumination monitoring, humidity monitoring and electricity monitoring; the constraint denotes the constraint conditions in data connection, including environmental condition and deviation; the time denotes time property of data, further divided into time zone information, duration information, and collection time point information.

What is claimed is:

1. A system for accessing data in the Internet of Things, comprising:
   an information database adapted to store data information relative to at least one of entities and objects in the Internet of Things; and
   an ontology database adapted to build data models, establish information classifications and information relationships, and realize access to data information stored in the information database based on semantic properties given to data information; and further adapted to dynamically generate new classifications and relationships for data information stored in the information database, wherein
   the information database is adapted to communicate with one or more perception devices to receive data information collected by the one or more perception devices relative to at least one of one or more entities and one or more objects,
   the ontology database is adapted to build data models that comprise a (resource-property-property value) format, in which individual data information collected by a perception device is identified as a resource, each resource is associated with a plurality of semantic properties, and there is identified a value corresponding with each semantic property, and
   the ontology database is adapted to communicate with one or more user devices to retrieve specific data information stored in the information database based on one or more data models and to deliver the specific data information to the one or more user devices.

2. The system according to claim 1, wherein
   the information database is adapted to receive and store data information collected by the one or more perception devices in the form of at least one of: temperature data, humidity data, illumination data, and electricity data.

3. The system according to claim 1, wherein
   the ontology database is adapted to associate a resource, in the form of data information collected by the one or more perception devices, with a plurality of semantic properties chosen from: time, space, subject, capability, collection object, collection mode, associated persons, and collection significance.

4. The system according to claim 1, wherein
   the ontology database is adapted to establish classifications in the form of at least one of:
   a type to which various entities belong,
   a type to which various objects belong, and
   a type to which various perception devices that collect data information belong.

5. The system according to claim 1, wherein
   the ontology database is adapted to establish relationships in the form of at least one of:
   a relationship between various entities,
   a relationship between various objects,
   a relationship between various perception devices,
   a multi-layer relationship between entities and perception devices that collect data information relative to those entities, and
   a multi-layer relationship between objects and perception devices that collect data information relative to those objects.

6. The system according to claim 1, wherein
   the ontology database is adapted to communicate with one or more service devices as an intermediary device for communicating with the one or more user devices.

7. A network for accessing data in the Internet of Things, comprising:
   a system according to claim 6; and
   one or more service devices adapted to communicate with the ontology database and one or more user devices, for retrieving specific data information in the information database and delivering the specific data information to the one or more user devices.

8. The network according to claim 7, further comprising:
   one or more user devices adapted to communicate with the one or more service devices for receiving the specific data information retrieved from the information database.

9. The system according to claim 1, wherein
   the information database is adapted to communicate with one or more gateway devices as an intermediary device for communicating with the one or more perception devices.

10. The system according to claim 9, wherein
    the ontology database is adapted to establish classifications in the form of: a type to which various gateway devices belong.

11. The system according to claim 9, wherein
    the ontology database is adapted to establish relationships in the form of at least one of:
    a relationship between various gateway devices;
    a multi-layer relationship between gateway devices and the perception devices that transmit data information to those gateway devices;
    a multi-layer relationship between gateway devices and entities that are the subject of data information transmitted to those gateway devices;
    a multi-layer relationship between gateway devices and objects that are the subject of data information transmitted to those gateway devices;
    a multi-layer relationship between gateway devices, the perception devices that transmit data information to those gateway devices, and the entities that are the subject of the data information; and
    a multi-layer relationship between gateway devices, the perception devices that transmit data information to those gateway devices, and the objects that are the subject of the data information.

12. A network for accessing data in the Internet of Things, comprising:
    a system according to claim 9; and
    one or more gateway devices adapted to communicate with the information database and one or more perception devices, for receiving data information collected by the one or more perception devices relative to at least one of one or more entities and one or more objects and delivering the collected data information to the information database data.

13. The network according to claim 12, further comprising:
    one or more perception devices adapted to communicate with the one or more gateway devices for delivering to the one or more gateway devices the collected data information.

14. The system according to claim 1, wherein
    the ontology database is adapted to build data models as a binary relationship in the (resource-property-property value) format.

15. The system according to claim 1, wherein
    the ontology database is adapted such that, when building a data model in the (resource-property-property value) format:

there is associated with each resource each of the semantic properties of: time, space, subject, capability, collection object, collection mode, associated persons, and collection significance, and there is identified, for each separate semantic property, a value corresponding to the respective semantic property.

\* \* \* \* \*